United States Patent
Sudhakar et al.

(10) Patent No.: US 8,909,904 B2
(45) Date of Patent: Dec. 9, 2014

(54) COMBINED BYTE-PERMUTE AND BIT SHIFT UNIT

(75) Inventors: Ranganathan Sudhakar, Santa Clara, CA (US); Jonathan Choy, Sunnyvale, CA (US); Debjit Das Sarma, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1156 days.

(21) Appl. No.: 12/482,974

(22) Filed: Jun. 11, 2009

(65) Prior Publication Data

US 2010/0318771 A1    Dec. 16, 2010

(51) Int. Cl.
*G06F 7/38* (2006.01)
*G06F 9/00* (2006.01)
*G06F 9/44* (2006.01)
*G06F 15/00* (2006.01)
*G06F 9/38* (2006.01)
*G06F 9/30* (2006.01)

(52) U.S. Cl.
CPC .......... *G06F 9/30032* (2013.01); *G06F 9/3851* (2013.01); *G06F 9/3891* (2013.01)
USPC ...................................................... 712/221

(58) Field of Classification Search
USPC ...................................................... 712/221
See application file for complete search history.

(56) References Cited

U.S. PATENT DOCUMENTS

| | | | | |
|---|---|---|---|---|
| 3,790,960 A | * | 2/1974 | Amdahl et al. | 708/209 |
| 4,631,703 A | * | 12/1986 | Sakamoto | 377/64 |
| 5,287,532 A | * | 2/1994 | Hunt | 712/10 |
| 5,872,943 A | | 2/1999 | Pickett et al. | |
| 5,901,076 A | | 5/1999 | Lynch | |
| 5,926,407 A | | 7/1999 | Mahurin | |
| 5,991,786 A | | 11/1999 | Mahurin | |
| 6,006,244 A | | 12/1999 | Mahurin | |
| 6,035,310 A | | 3/2000 | Mahurin | |
| 6,327,651 B1 | * | 12/2001 | Dubey et al. | 712/300 |
| 6,718,456 B1 | * | 4/2004 | Ott | 712/210 |
| 7,237,095 B1 | | 6/2007 | Hopper | |
| 7,337,202 B2 | * | 2/2008 | Datta et al. | 708/209 |
| 2006/0015702 A1 | | 1/2006 | Khan et al. | |

OTHER PUBLICATIONS

Mitch Ross, "CS 301 Course Notes: Arithmetic and Logical Operations, Assembly Language Programming", 1998.*
Hewlett-Packard, "PA-RISC 2.0," 1995, pp. 7-40, 41, 42, 43, 44, 45, 48, 49, 50, 51, 108, 109.

* cited by examiner

*Primary Examiner* — Corey S Faherty

(74) *Attorney, Agent, or Firm* — Rory D. Rankin; Meyertons, Hood, Kivlin, Kowert & Goetzel, P.C.

(57) ABSTRACT

A processor includes a decode unit and a byte permute unit. The byte permute unit receives an instruction from the decode unit. The byte permute unit determines whether the instruction corresponds to a shuffle instruction or a shift instruction. For a shuffle instruction, the byte permute unit uses a byte shuffler to perform a shuffle operation indicated by the instruction. For a shift instruction that indicates a shift magnitude, the byte permute unit uses the byte shuffler to byte-level shift a source operand corresponding to the instruction by an integer number of bytes. The byte permute unit also generates a sequence of output bits by bit-shifting the byte-level shifted source operand by a number of bits such that the sum of the number of bits and the integer number of bytes is equal to the shift magnitude.

20 Claims, 8 Drawing Sheets

COMBINED BYTE-PERMUTE AND BIT SHIFT UNIT

BACKGROUND OF THE INVENTION

1. Field of the Invention

This invention relates to computer processors and, more particularly, to performing byte-permutation and bit-shift operations in computer processors.

2. Description of the Related Art

Microprocessors have evolved to include a variety of features aimed at improving the speed and efficiency with which instructions are executed. At the same time, microprocessors have been designed around a variety of instruction architectures. For example, the x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

Included among the x86 instructions that are commonly implemented are shuffle instructions. Shuffle instructions are configured to relocate or reorder portions of an operand within itself. Shuffle instructions may perform a variety of functions, such as packing, unpacking, byte interleaving, swizzle, and other byte permutations. Processor architectures which support the x86 instruction set generally include circuitry to perform shuffles using operands of up to 32-bytes.

In addition to shuffle instructions, the x86 instruction set includes a number of shift instructions. Those skilled in the art are well aware of the wide-ranging uses of shift operations within processors generally. As processors have advanced, and the applications to which they are applied become more sophisticated, extensions to the instruction set have been introduced. For example, the x86 Streaming SIMD Extensions (SSE) instruction set has been extended to include 128-bit shift instructions. While such instructions may be beneficial for particular applications, efficiently supporting such instructions in a given processor may present some challenges. For example, even in an x86 architecture that has been configured to support 64-bit operands, a 128-bit shift operation may generally require circuitry to logically concatenate at least two 64-bit registers in order to accommodate a 128-bit operand. Depending upon the implementation, such an approach may introduce additional latencies into the critical path.

In addition, the x86 instruction set includes support for byte-level and bit-level shift operations. Shift operations may also include either logical or arithmetic shift operations. Arithmetic right shift operations must include sign-extension whereas logical shift operations do not include sign-extension. Generally speaking, logical and arithmetic classes of shift operations have been implemented using separate execution units, incurring higher costs in terms of circuit area and power consumption. In view of the above, an effective method and mechanism for performing shift operations is desired.

SUMMARY OF THE INVENTION

Various embodiments of a processor and methods are disclosed. The processor includes a decode unit and a byte permute unit. The byte permute unit receives an instruction from the decode unit. The byte permute unit determines whether the instruction corresponds to a shuffle instruction or a shift instruction. In response to determining the instruction corresponds to a shuffle instruction, the byte permute unit uses a byte shuffler to perform a shuffle operation indicated by the instruction. In response to determining the instruction corresponds to a shift instruction that indicates a shift magnitude, the byte permute unit uses the byte shuffler to byte-level shift a source operand corresponding to the instruction by an integer number of bytes. The byte permute unit also generates a sequence of output bits by bit-shifting the byte-level shifted source operand by a number of bits such that the sum of the number of bits and the integer number of bytes is equal to the shift magnitude.

In a further embodiment, in response to determining the instruction corresponds to a shift instruction, the byte permute unit generates a sequence of output bits in which a bit index value corresponds to an output bit position in the sequence. Shifting the byte-level shifted source operand by a number of bits includes for each output bit position, performing an arithmetic computation on the number of bits and the corresponding bit index value and using a result of the arithmetic computation to select data in a bit position of the byte-level shifted source operand for relocation to a corresponding output bit position.

For a shift instruction, the byte permute unit determines whether the instruction corresponds to a shift in a first direction or in a direction opposite to the first direction. For a shift in the first direction, the integer number of bytes equals the quotient of the shift magnitude divided by eight and the byte permute unit subtracts the shift magnitude modulo eight from the bit index value. For a shift in the direction opposite to the first direction, the integer number of bytes equals one plus the quotient of the shift magnitude divided by eight and the byte permute unit subtracts eight minus the shift magnitude modulo eight from the bit index value.

In a further embodiment in which the source operand includes 128 bits, the byte permute unit forces a value of a bit at an output bit position to zero in response to detecting either the arithmetic computation results in a negative value or the arithmetic computation results in value greater than 127. In another further embodiment, the byte permute unit forces a value of a bit of the sequence of output bits to a value of a most significant bit of the byte-shifted source operand in response to detecting the shift operation is an arithmetic right shift operation and the arithmetic computation results in value greater than 127.

In a still further embodiment, for each output byte in the sequence of output bytes, a byte index value corresponds to an output byte position in the sequence. To perform a byte-level shift, the byte permute unit performs an arithmetic computation on the byte index and the integer number of bytes and uses a result of the arithmetic computation to select data in a byte position of the source operand for relocation to an output byte position. In a still further embodiment the source operand includes 16 bytes and for each output byte in the sequence the byte permute unit forces a value of each bit to a value of a most significant bit of the source operand in response to detecting the shift operation is an arithmetic right shift operation and the arithmetic computation results in value greater than 15 and forces a value of each bit to zero in response to detecting the shift operation is not an arithmetic right shift operation and either the arithmetic computation results in a negative value or the arithmetic computation results in a value greater than 15.

Figure 1:
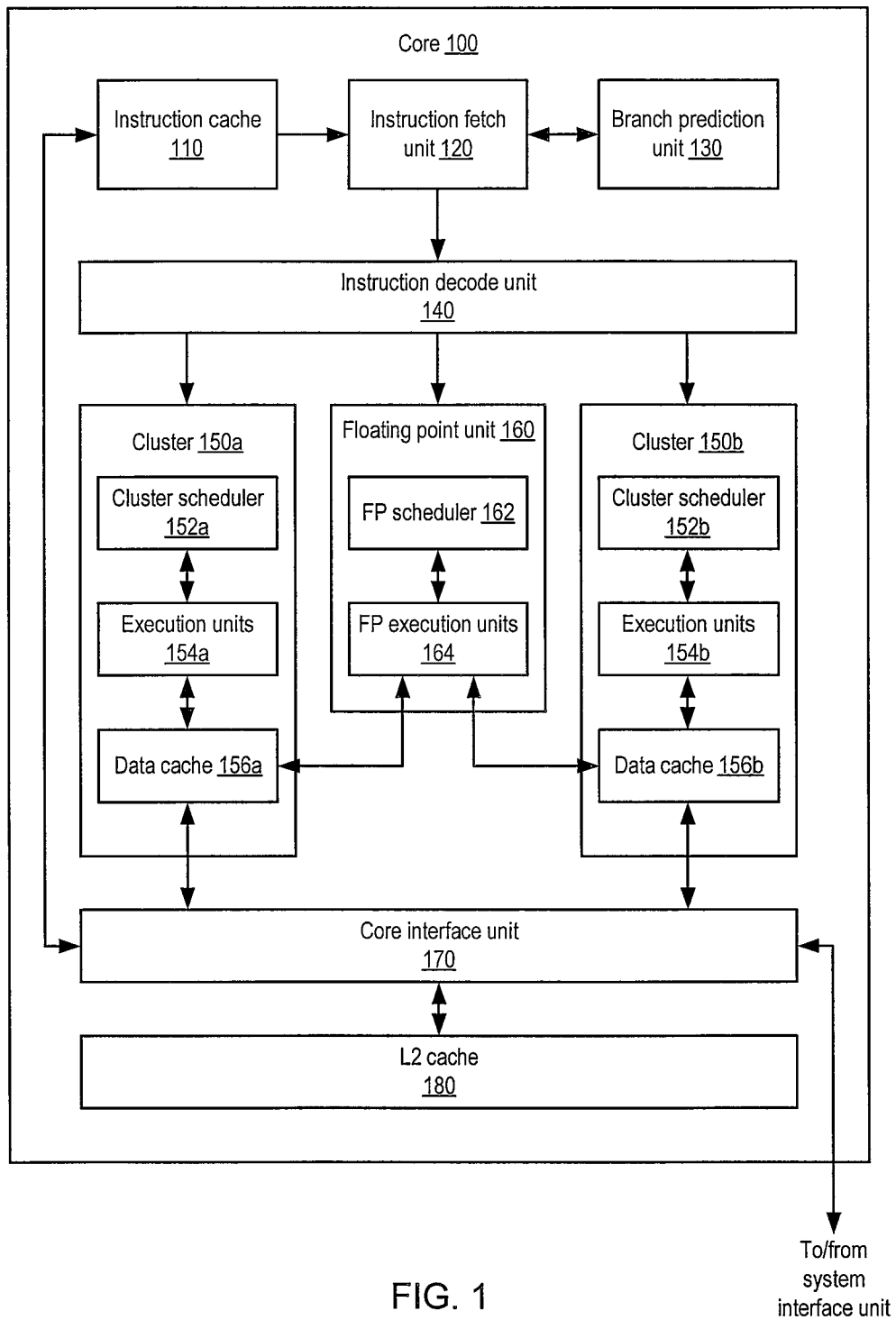
FIG. 1 illustrates one embodiment of a processor core.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Overview of Processor Core

FIG. 1 illustrates one embodiment of a processor core 100. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 110 coupled to provide instructions to an instruction fetch unit (IFU) 120. IFU 120 may be coupled to a branch prediction unit (BPU) 130 and to an instruction decode unit 140. Decode unit 140 may be coupled to provide operations to a plurality of integer execution clusters 150a-b as well as to a floating point unit (FPU) 160. Each of clusters 150a-b may include a respective cluster scheduler 152a-b coupled to a respective plurality of integer execution units 154a-b. Clusters 150a-b may also include respective data caches 156a-b coupled to provide data to execution units 154a-b. In the illustrated embodiment, data caches 156a-b may also provide data to floating point execution units 164 of FPU 160, which may be coupled to receive operations from FP scheduler 162. Data caches 156a-b and instruction cache 110 may additionally be coupled to core interface unit 170, which may in turn be coupled to a unified L2 cache 180 as well as to a system interface unit (SIU) that is external to core 100 (not shown). It is noted that although FIG. 1 reflects certain instruction and data flow paths among various units, additional paths or directions for data or instruction flow not specifically shown in FIG. 1 may be provided.

Core 100 may be configured for multithreaded execution in which instructions from distinct threads of execution may concurrently execute. In one embodiment, each of clusters 150a-b may be dedicated to the execution of instructions corresponding to a respective one of two threads, while FPU 160 and the upstream instruction fetch and decode logic may be shared among threads. In other embodiments, it is contemplated that different numbers of threads may be supported for concurrent execution, and different numbers of clusters 150 and FPUs 160 may be provided.

Generally speaking, clusters 150 may be configured to implement integer arithmetic and logic operations as well as to perform load/store operations. In one embodiment, each of clusters 150a-b may be dedicated to the execution of operations for a respective thread, such that when core 100 is configured to operate in a single-threaded mode, operations may be dispatched to only one of clusters 150. Each cluster 150 may include its own scheduler 152, which may be configured to manage the issuance for execution of operations previously dispatched to the cluster. Each cluster 150 may further include its own copy of the integer physical register file as well as its own completion logic (e.g., a reorder buffer or other structure for managing operation completion and retirement).

Within each cluster 150, execution units 154 may support the concurrent execution of various different types of operations. For example, in one embodiment execution units 154 may support two concurrent load/store address generation (AGU) operations and two concurrent arithmetic/logic (ALU) operations, for a total of four concurrent integer operations per cluster. Execution units 154 may support additional operations such as integer multiply and divide, although in various embodiments, clusters 150 may implement scheduling restrictions on the throughput and concurrency of such additional operations with other ALU/AGU operations. Additionally, each cluster 150 may have its own data cache 156 that, like instruction cache 110, may be implemented using any of a variety of cache organizations. It is noted that data caches 156 may be organized differently from instruction cache 110.

In the illustrated embodiment, unlike clusters 150, FPU 160 may be configured to execute floating-point operations from different threads, and in some instances may do so concurrently. FPU 160 may include FP scheduler 162 that, like cluster schedulers 152, may be configured to receive, queue and issue operations for execution within FP execution units 164. FPU 160 may also include a floating-point physical register file configured to manage floating-point operands. FP execution units 164 may be configured to implement various types of floating point operations, such as add, multiply, divide, and multiply-accumulate, as well as other floating-point, multimedia or other operations that may be defined by the ISA. In various embodiments, FPU 160 may support the concurrent execution of certain different types of floating-point operations, and may also support different degrees of precision (e.g., 64-bit operands, 128-bit operands, etc.). As shown, FPU 160 may not include a data cache but may instead be configured to access the data caches 156 included within clusters 150. In some embodiments, FPU 160 may be configured to execute floating-point load and store instructions, while in other embodiments, clusters 150 may execute these instructions on behalf of FPU 160.

In various embodiments, a processor implementation may include multiple instances of core 100 fabricated as part of a single integrated circuit along with other structures. A processor may be coupled to system memory consisting of one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory. The contents of system memory may be cached by various ones of the caches described above.

In one embodiment, core 100 may execute a variety of byte shuffle instructions, byte-level shift instructions, and bit-level shift instructions. In the following discussions, specific examples of some instructions that are executed within floating point execution units 164 will be considered. For example, a byte shuffle instruction that operates on a 32-byte operand using a 16-byte immediate control word may be executed. Also, left and right arithmetic and logical shift instructions of either byte-level granularity or bit-level granularity may be executed. In one embodiment, a single one of floating point execution units 164 may execute any of these instructions, as described in detail below.

Figure 2:
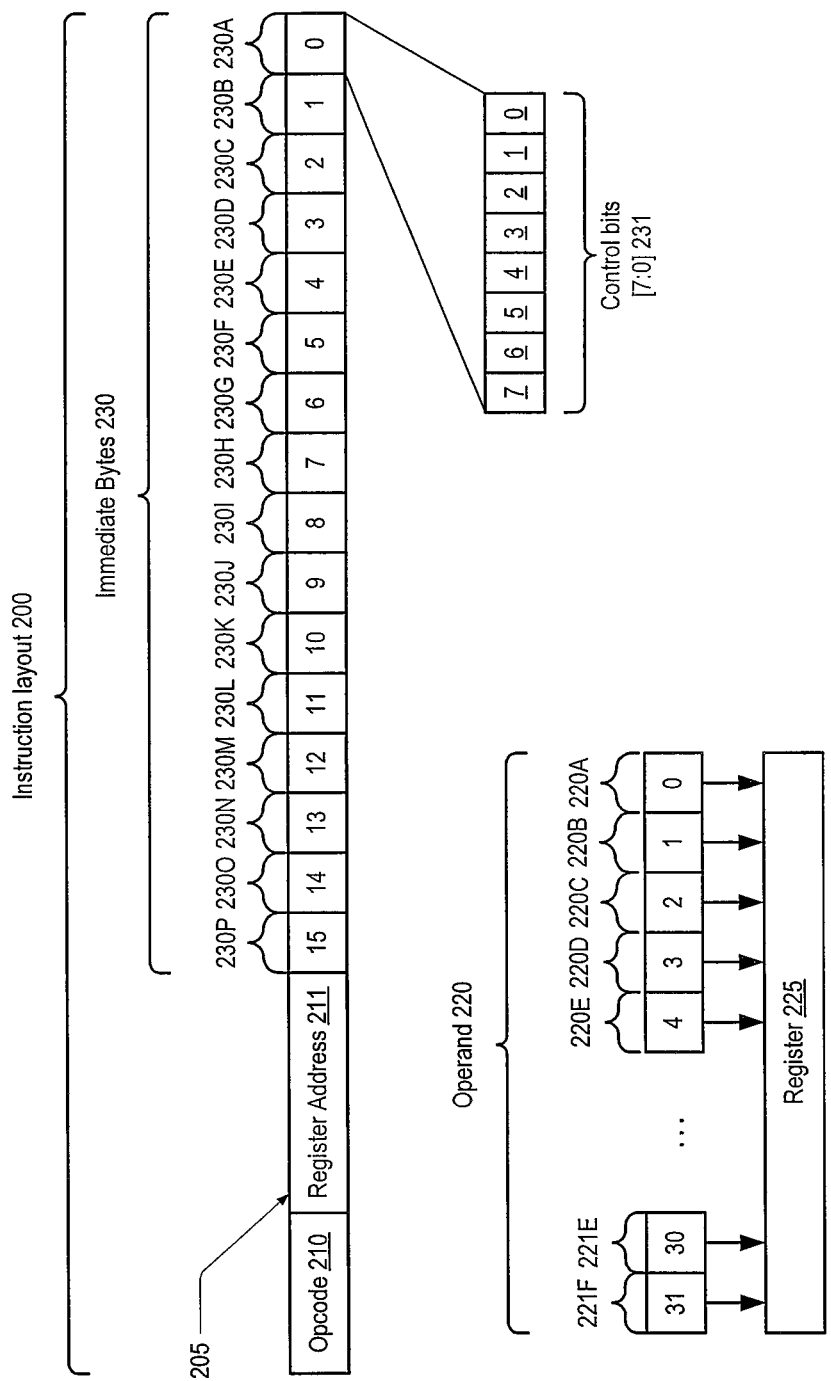
FIG. 2 illustrates one embodiment of an instruction layout and the layout of a corresponding operand register for a variety of byte shuffle and shift instructions.

FIG. 2 illustrates one embodiment of an instruction layout 200 and the layout of a corresponding operand register 225 for a variety of byte shuffle and shift instructions. Instruction layout 200 corresponds to any of a variety of immediate instructions 205. For example, instruction 200 may correspond to any of the following instructions:

Packed Shift Left Logical Words (PSLLW)
Packed Shift Left Logical Doublewords (PSLLD)
Packed Shift Left Logical Quadwords (PSLLQ)
Packed Shift Right Logical Words (PSRLW)
Packed Shift Right Logical Doublewords (PSRLD)
Packed Shift Right Logical Quadwords (PSRLQ)
Packed Shift Right Arithmetic Words (PSRAW)
Packed Shift Right Arithmetic Doublewords (PSRAD)
Packed Shift Right Arithmetic Quadwords (PSRAQ)

Each instruction 205 may include an opcode 210, a register address 211 and immediate bytes 230. For convenience, the following discussion will be confined to immediate versions of these and similar instructions, although it will be apparent to one of ordinary skill in the art that the invention may be applied equally to similar, non-immediate instructions. In the illustrated embodiment, immediate bytes 230 may include 16 bytes 230A-230P that are also shown as immediate bytes 0-15. It is noted that elements indicated by a number followed by a letter such as bytes 230A-230P may be collectively referred to herein by the number alone, e.g. bytes 230. Each of byes 230 includes eight control bits [7:0 ] 231. The functions of control bits 231 are described in further detail below.

In one embodiment, register address 211 may identify a register 225, which may contain an operand 220 of up to 32 bytes for use by an instruction 205. In the illustrated embodiment, operand 220 includes 32 bytes 220A-220Z and 221A-221F that are also shown as operand bytes 0-31.

Figure 3:
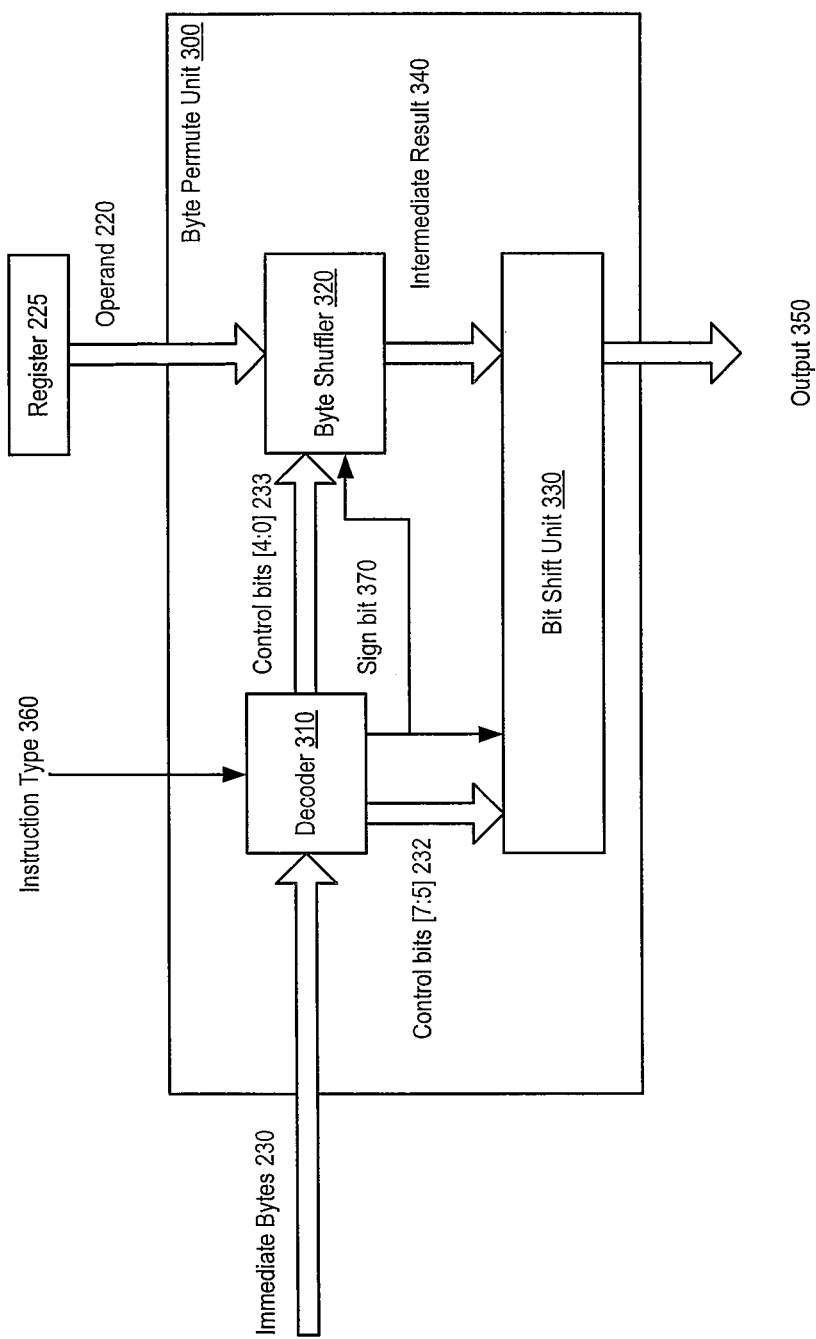
FIG. 3 illustrates one embodiment of a byte permute unit that may be used to execute an instruction.

FIG. 3 illustrates one embodiment of a byte permute unit that may be used to execute an instruction 205. In one embodiment, byte permute unit 300 may be contained within a floating point execution unit 164. Byte permute unit 300 may be configure to execute both byte shuffle and shift instructions. As shown, byte permute unit 300 includes a decoder 310 coupled to a byte shuffler 320 and a bit shift unit 330. During operation, decoder 310 may receive an instruction type indication 360 and one or more immediate bytes 230 from instruction decode unit 140. Byte shuffler 320 may receive operand 220 from register 225. Register 225 may be implemented as a single 32-byte register or, in alternative embodiments, 2 concatenated 16-byte registers, 4 concatenated 8-byte registers, etc. Decoder 310 may extract control bits [4:0 ] 233 from immediate bytes 230 and a sign bit 370 from instruction type indicator 360 and convey them to byte shuffler 320. For example, if the instruction type indicates a shuffle instruction, for each of immediate bytes 230A-230P, decoder 310 may extract the lowest order 5 bits to produce a set of control bits [4:0 ] 233. If the instruction type indicates a shift instruction, decoder 310 may extract control bits [7:5 ] 232 and control bits [4:0 ] 233 from a single one of immediate bytes 230A-230P, for example byte 230A. More particularly, in one embodiment, assuming the value of byte 230A is N and bit shift unit 330 is configured to perform either left or right bit shift operations, decoder 310 may set the value of control bits [7:5 ] 232 to N/8 and the value of control bits [4:0 ] 233 to N modulo 8. In an alternative embodiment, assuming the value of byte 230A is N and bit shift unit 330 is configured to perform left bit shift operations only, decoder 310 may set the value of control bits [7:5 ] 232 to N/8 and the value of control bits [4:0 ] 233 to N modulo 8 for left shift operations and decoder 310 may set the value of control bits [7:5 ] 232 to 1+N/8 and the value of control bits [4:0 ] 233 to 8−(N modulo 8) for right shift operations. Decoder 310 may also convey control bits [7:5 ] 232 and sign bit 370 to bit shift unit 330. Byte shuffler 320 may permute or shift the bytes of operand 220 to produce intermediate result 340 based on the values of control bits [4:0 ] 233 and sign bit 370. Byte shuffler 320 may convey intermediate result 340 to bit shift unit 330. Bit shift unit 330 may perform bit-level shifting of intermediate result 340 based on the values of control bits [7:5 ] 232 and sign bit 370 to produce output 350. In one embodiment, if instruction type 360 indicates that an instruction does not require bit-level shifting, bit shift unit 330 may be configured to pass intermediate result 340 through as output 350.

Figure 4:
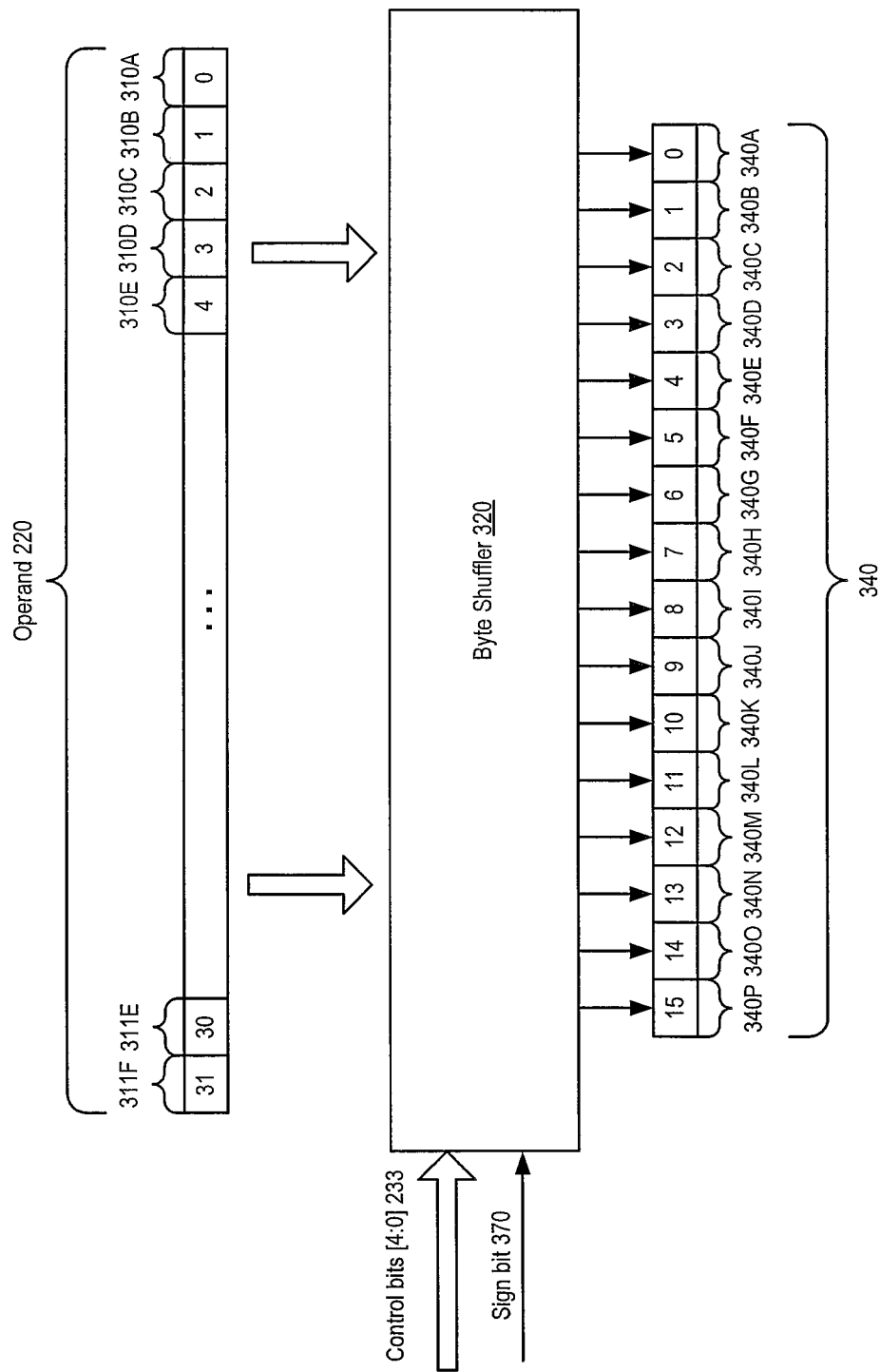
FIG. 4 is an overview of the operation of one embodiment of byte shuffler.

FIG. 4 is an overview of the operation of one embodiment of byte shuffler 320. In one embodiment, byte shuffler 320 receives operand 220 including up to 32 bytes 220A-220Z and 221A-221F, also labeled bytes 0 through 31. Generally speaking, byte shuffler 320 may be modeled as a set of 32 multiplexers, each of which is a 16-to-1 byte-wide multiplexer. Byte shuffler 320 produces intermediate result 340 by shuffling or shifting the individual bytes 0 to 31 according to the type of instruction, the value of control bits [4:0 ] 233, and the value of sign bit 370. In one embodiment in which bit shift unit 330 is configured to perform either left or right bit shift operations, intermediate result 340 may comprise bytes 340A-340P, also labeled bytes 0-15. In an alternative embodiment, in which bit shift unit 330 is configured to perform left bit-shift operations only (not shown), intermediate result 340 may comprise bytes 340A-340P and one additional byte below byte 340A to accommodate temporary overshifting during right shift operations. Various embodiments of a byte shuffler 320 are described in pending U.S. patent application Ser. No. 11/192,153, filed by inventors Teik-Chung Tan and Kelvin Domnic Goveas entitled "Using a shuffle unit to implement shift operations in a processor," assigned to the assignor of the present application, the disclosure of which is incorporated herein by reference for all purposes.

Table 1 lists formulas for determining the intermediate result byte values of one embodiment of byte shuffler 320 for various instruction types. In Table 1, Q(m) represents the mth intermediate byte value for 0≤m≤15, P(m) represents the mth input byte value, k(m) is the value of the mth set of control bits [4:0 ] 233 and n is the number of bytes specified for a shift instruction. It is assumed that a left shift instruction of b bits can always be implemented as a left byte level shift operation of n bytes followed by a left bit-level shift operation of j bits, where b=8*n+j and a right shift instruction of b bits can always be expressed as a right byte level shift operation of n bytes followed by a right bit-level shift operation of j bits, where b=8*n+j.

TABLE 1

| Instruction Type | Output Byte Q(m) |
| --- | --- |
| n byte arithmetic or logical left shift | Q(m) = P(m − n) if m ≥ n<br>Q(m) = '00h' if m < n |
| n byte arithmetic right shift | Q(m) = P(m + n) if m + n < 16<br>Q(m) = 'FFh' if m + n ≥ 16 and MSB of P(15) = '1'<br>Q(m) = '00h' if m + n ≥ 16 and MSB of P(15) = '0' |

TABLE 1-continued

| Instruction Type | Output Byte Q(m) |
| --- | --- |
| n byte logical right shift | Q(m) = P(m + n) if m + n < 16 |
| | Q(m) = '00h' if m + n ≥ 16 |
| Shuffle | Q(m) = P(k(m)) |

Table 2 lists formulas for determining the intermediate result byte values of an alternative embodiment of byte shuffler 320 for various instruction types. In Table 2, Q(m) represents the mth intermediate byte value for 0≤m≤15, P(m) represents the mth input byte value, k(m) is the value of the mth set of control bits [4:0] 233 and n is the number of bytes specified for a shift instruction. It is assumed that a left shift instruction of b bits can always be implemented as a left byte level shift operation of n bytes followed by a left bit-level shift operation of j bits, where b=8*n+j and a right shift instruction of b bits can always be expressed as a right byte level shift operation of n+1 bytes followed by a left bit-level shift operation of 8-j bits, where b=8*n+j.

TABLE 2

| Instruction Type | Output Byte Q(m) |
| --- | --- |
| n byte arithmetic or logical left shift | Q(m) = P(m − n) if m ≥ n |
| | Q(m) = '00h' if m < n |
| n byte arithmetic right shift | Q(m) = P(m + n + 1) if m + n < 15 |
| | Q(m) = 'FFh' if m + n ≥ 15 and MSB of P(15) = '1' |
| | Q(m) = '00h' if m + n ≥ 15 and MSB of P(15) = '0' |
| n byte logical right shift | Q(m) = P(m + n + 1) if m + n < 15 |
| | Q(m) = '00h' if m + n ≥ 15 |
| Shuffle | Q(m) = P(k(m)) |

Figure 5:
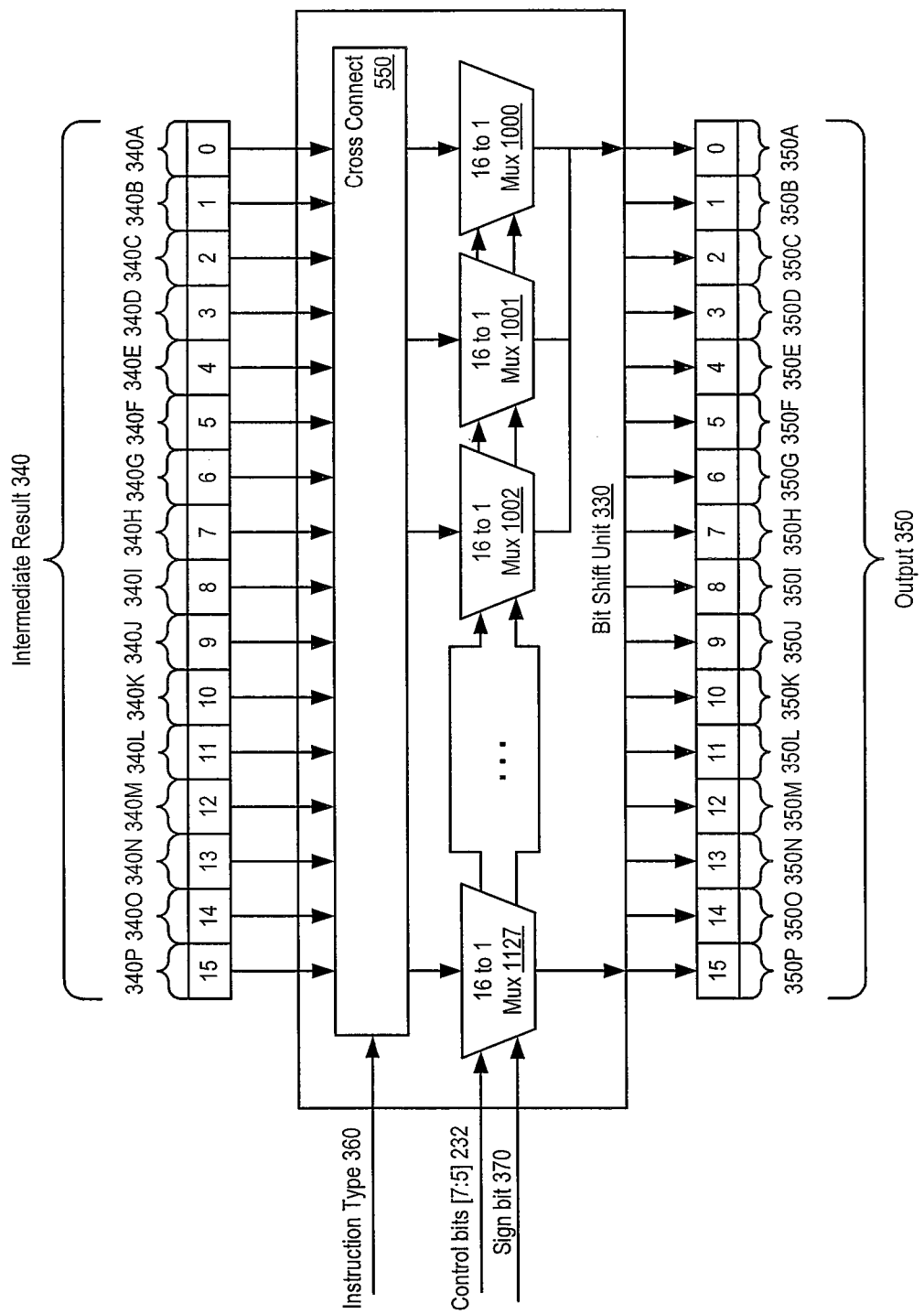
FIG. 5 is an overview of the operation of one embodiment of a bit shift unit.

FIG. 5 is an overview of the operation of one embodiment of bit shift unit 330 that is configured to perform either left or right bit shift operations. In one embodiment, bit shift unit 330 receives intermediate result 340 including 16 bytes 340A-340P, also labeled bytes 0 through 15 and produces output 350 including 16 bytes 350A-350P, also labeled bytes 0 through 15. In the illustrated embodiment bit shift unit 330 includes a cross connect 550 coupled to a set of 128 16-to-1 multiplexers 1000-1127. Bit shift unit 330 receives instruction type 360, sign bit 370, and control bits [7:5] 232. Instruction type 360 may be used by cross connect 550 to determine whether or not to implement sign-extension, such as for arithmetic right shift operations. Each of multiplexers 1000-1127 is associated with a respective output bit of output 350. Sign bit 370 and control bits [7:5] 232 may be used by multiplexers 1000-1127 to select a source bit, thereby implementing a bit-level shift of up to ±7 bits. A detailed view of the operation of a portion of bit shift unit 330 showing the implementation of sign-extension is given below.

Table 3 lists formulas for determining the output 350 bit values of one embodiment of bit shift unit 330 for various instruction types. In Table 3, R(i) represents the ith output bit value for 0≤i≤15, Q(i) represents the ith intermediate result bit value, and j is the number of bits specified for a shift instruction, as determined by control bits [7:5].

TABLE 3

| Instruction Type | Output Bit R(i) |
| --- | --- |
| j bit arithmetic or logical left shift | R(i) = Q(i − j) if i ≥ j |
| | R(i) = '0' if i < j |
| j bit arithmetic right shift | R(i) = Q(i + j) if i + j < 8 |
| | R(i) = MSB value of Q(15) if i + j ≥ 8 |
| j bit logical right shift | R(i) = Q(i + j) if i + j < 8 |
| | R(i) = '0' if i + j ≥ 8 |

Table 4 illustrates the mapping of input bits to output bits for arithmetic shift operations in one embodiment of bit shift unit 330.

TABLE 4

| Sign bit 370 | Control bits [7:5] 232 | 350P bit 7 | 350P bit 6 | 350P bit 5 | ... | 350A bit 1 | 350A bit 0 |
| --- | --- | --- | --- | --- | --- | --- | --- |
| R | 111 | 340P bit 7 | 340P bit 7 | 340P bit 7 | ... | 340B bit 0 | 340A bit 7 |
| R | 110 | 340P bit 7 | 340P bit 7 | 340P bit 7 | ... | 340A bit 7 | 340A bit 6 |
| R | 101 | 340P bit 7 | 340P bit 7 | 340P bit 7 | ... | 340A bit 6 | 340A bit 5 |
| R | 100 | 340P bit 7 | 340P bit 7 | 340P bit 7 | ... | 340A bit 5 | 340A bit 4 |
| R | 011 | 340P bit 7 | 340P bit 7 | 340P bit 7 | ... | 340A bit 4 | 340A bit 3 |
| R | 010 | 340P bit 7 | 340P bit 7 | 340P bit 7 | ... | 340A bit 3 | 340A bit 2 |
| R | 001 | 340P bit 7 | 340P bit 7 | 340P bit 6 | ... | 340A bit 2 | 340A bit 1 |
| R | 000 | 340P bit 7 | 340P bit 6 | 340P bit 5 | ... | 340A bit 1 | 340A bit 0 |
| L | 000 | 340P bit 7 | 340P bit 6 | 340P bit 5 | ... | 340A bit 1 | 340A bit 0 |
| L | 001 | 340P bit 6 | 340P bit 5 | 340P bit 4 | ... | 340A bit 0 | 0 |
| L | 010 | 340P bit 5 | 340P bit 4 | 340P bit 3 | ... | 0 | 0 |
| L | 011 | 340P bit 4 | 340P bit 3 | 340P bit 2 | ... | 0 | 0 |
| L | 100 | 340P bit 3 | 340P bit 2 | 340P bit 1 | ... | 0 | 0 |
| L | 101 | 340P bit 2 | 340P bit 1 | 340P bit 0 | ... | 0 | 0 |
| L | 110 | 340P bit 1 | 340P bit 0 | 340O bit 7 | ... | 0 | 0 |
| L | 111 | 340P bit 0 | 340O bit 7 | 340O bit 6 | ... | 0 | 0 |

Figure 6:
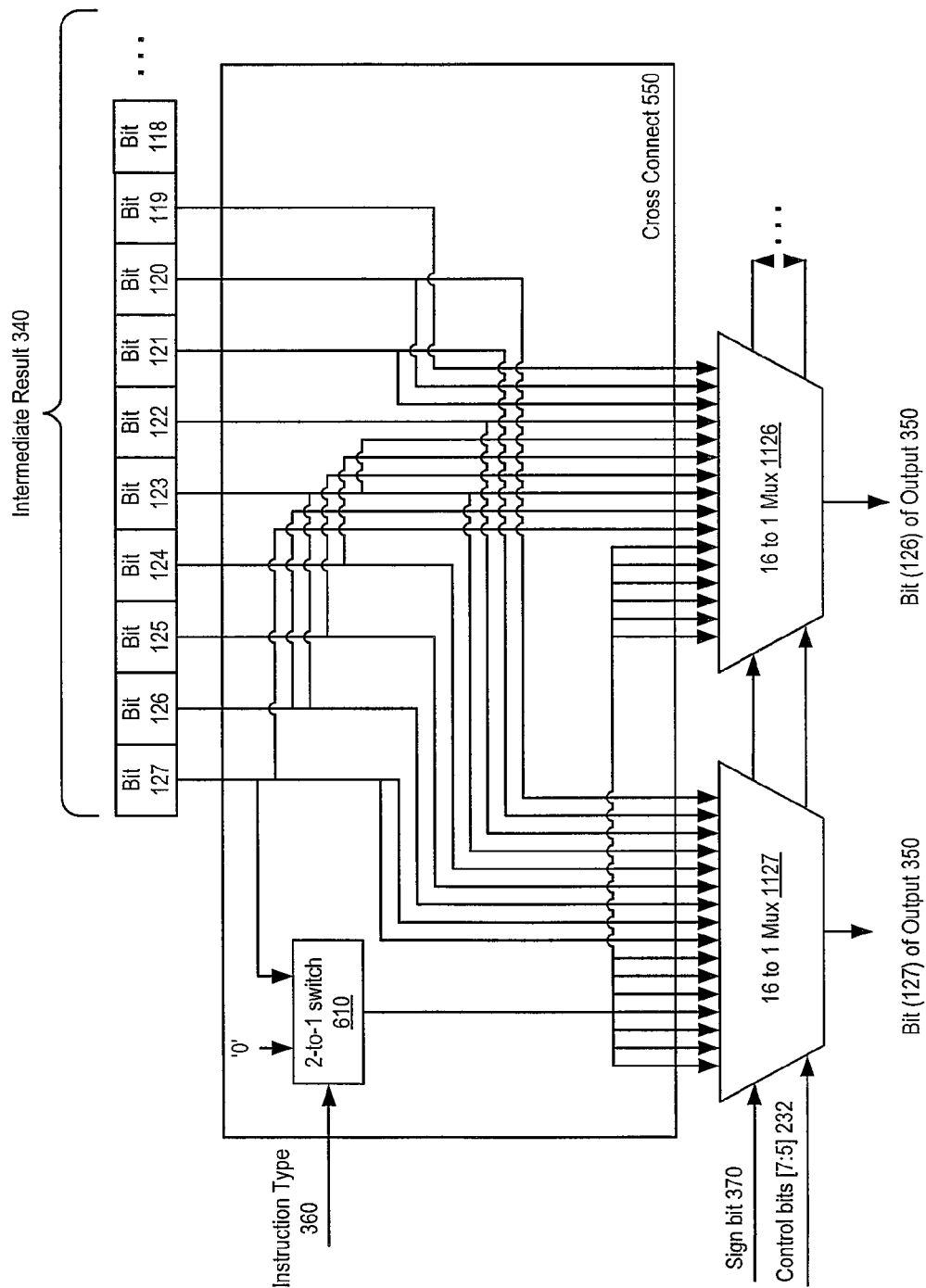
FIG. 6 illustrates the operation of a portion of one embodiment of bit shift unit.

FIG. 6 illustrates the operation of a portion of one embodiment of bit shift unit 330. In the illustrated embodiment, cross connect 550 is shown coupled to 16-to-1 multiplexers 1127, 1126, etc. Within cross connect 550, a 2-to-1 switch 610 may determine whether or not sign extension is implemented, based on the value of instruction type 360. For example, if instruction type 360 indicates an arithmetic right shift operation, sign-extension may be implemented and the output of switch 610 may be equal to the value of bit 127, the MSB of intermediate result 340. For any other instruction type, the output of switch 610 may be equal to '0'. During operation, multiplexer 1127 may determine the source for the most significant bit of output 350, multiplexer 1126 may determine the source for the next significant bit of output 350, etc. The most significant 7 bits of multiplexer 1127 may be connected to the output of switch 610. The next two most significant bits of multiplexer 1127 may be connected to bit 127, the MSB of intermediate result 340, the next most significant bit to bit 126 of intermediate result 340, etc. Two bits may be connected to bit 127 to correspond with left and right shifts of zero bit magnitude. The most significant 6 bits of multiplexer 1126 may be connected to the output of switch 610. The next two most significant bits of multiplexer 1126 may be connected to bit 127, the MSB of intermediate result 340, the next most significant bit to bit 125 of intermediate result 340, etc. Two bits may be connected to bit 126 to correspond with left and right shifts of zero bit magnitude. Accordingly, the output produced by the embodiment illustrated in FIG. 6 matches the results given in Tables 2 and 3 above.

Figure 7:
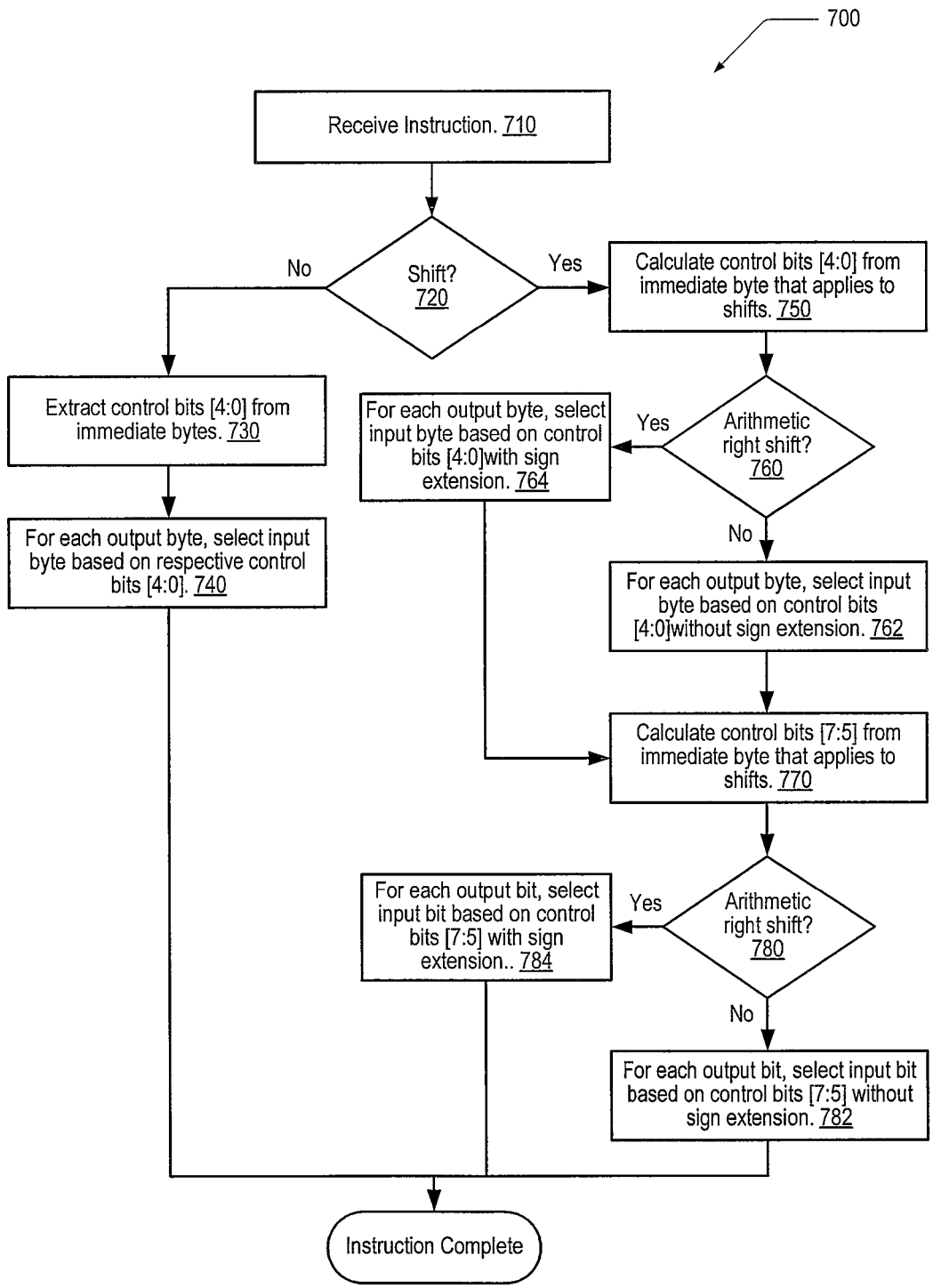
FIG. 7 illustrates one embodiment of a process that may be used to perform byte shuffle and bit shift operations.

FIG. 7 illustrates one embodiment of a process 700 that may be used to perform byte shuffle and bit shift operations. Process 700 begins with the reception of an instruction (block 710). The instruction may be decoded to determine if it is a shift instruction or a shuffle instruction (decision block 720). If the received instruction is a shuffle instruction, control bits [4:0] may be extracted from the immediate bytes of the instruction (block 730). Then, for each output byte, an input source byte may be selected based on the value of a respective set of control bits [4:0], completing execution of the instruction. If the instruction is a shift instruction, control bits [4:0] may be calculated from an immediate byte of the instruction (block 750). Unlike in a shuffle instruction in which there are separate control bits [4:0] for each output byte, in a shift instruction, a single set of control bits [4:0] applies to every intermediate byte. Next, if the instruction type is not an arithmetic right shift (decision block 760), for each intermediate byte, an input source byte may be selected based on the value of control bits [4:0] without sign extension (block 762). If the instruction type is an arithmetic right shift (decision block 760), for each intermediate byte, an input source byte may be selected based on the value of control bits [4:0] with sign extension (block 764). Once the intermediate result has been produced, with or without sign extension, control bits [7:5] may be then be calculated from the immediate byte of the instruction (block 770). If the instruction type is not an arithmetic right shift (decision block 780), for each output bit, an intermediate source bit may be selected based on the value of control bits [7:5] without sign extension to produce an output bit (block 782), completing execution of the instruction. If the instruction type is an arithmetic right shift (decision block 780), for each output bit, an intermediate source bit may be selected based on the value of control bits [7:5] with sign extension to produce an output bit (block 784), completing execution of the instruction.

It is noted that the foregoing flow chart is for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

Figure 8:
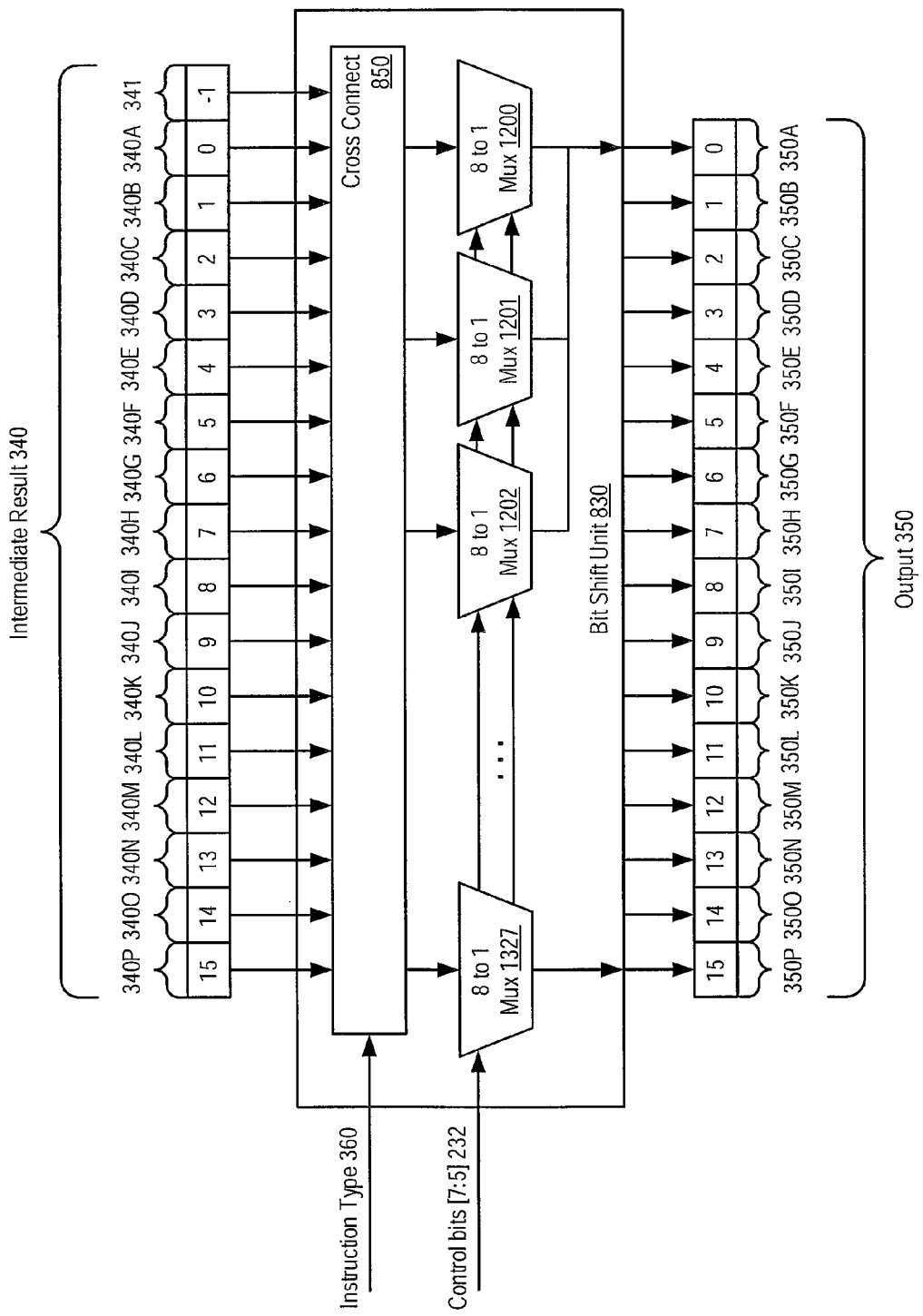
FIG. 8 is an overview of the operation of an alternative embodiment of a bit shift unit.

FIG. 8 is an overview of the operation of an alternative embodiment of bit shift unit 830 that is configured to perform left bit shift operations only. In the illustrated embodiment, bit shift unit 830 receives intermediate result 340 including 16 bytes 341 and 340A-340P, also labeled bytes −1 and 0 through 15 and produces output 350 including 16 bytes 350A-350P, also labeled bytes 0 through 15. In the illustrated embodiment, bit shift unit 830 includes a cross connect 850 coupled to a set of 128 8-to-1 multiplexers 1200-1327. Bit shift unit 830 receives instruction type 360 and control bits [7:5] 232. Each of multiplexers 1200-1327 is associated with a respective output bit of output 350. Control bits [7:5] 232 may be used by multiplexers 1200-1327 to select a source bit, thereby implementing a bit-level left shift of up to 7 bits.

Table 5 lists formulas for determining the output 350 bit values of one embodiment of bit shift unit 830 for various instruction types. In Table 5, R(i) represents the ith output bit value for $0 \le i \le 7$, Q(i) represents the ith intermediate result bit value, and j is the number of bits specified for a shift instruction, as determined by control bits [7:5].

TABLE 5

| Instruction Type | Output Bit R(i) |
|---|---|
| j bit arithmetic or logical left shift | R(i) = Q(i − j) if i ≥ j<br>R(i) = '0' if i < j |

Table 6 illustrates the mapping of input bits to output bits for left shift operations in one embodiment of bit shift unit 830.

TABLE 6

| Control bits [7:5] 232 | 350A bit 0 | 350A bit 1 | 350A bit 2 | ... | 350P bit 6 | 350P bit 7 |
|---|---|---|---|---|---|---|
| 111 | 341 bit 1 | 341 bit 2 | 341 bit 3 | ... | 340O bit 7 | 340P bit 0 |
| 110 | 341 bit 2 | 341 bit 3 | 341 bit 4 | ... | 340P bit 0 | 340P bit 1 |
| 101 | 341 bit 3 | 341 bit 4 | 341 bit 5 | ... | 340P bit 1 | 340P bit 2 |
| 100 | 341 bit 4 | 341 bit 5 | 341 bit 6 | ... | 340P bit 2 | 340P bit 3 |
| 011 | 341 bit 5 | 341 bit 6 | 341 bit 7 | ... | 340P bit 3 | 340P bit 4 |
| 010 | 341 bit 6 | 341 bit 7 | 340A bit 0 | ... | 340P bit 4 | 340P bit 5 |
| 001 | 341 bit 7 | 340A bit 0 | 340A bit 1 | ... | 340P bit 5 | 340P bit 6 |
| 000 | 340A bit 0 | 340A bit 1 | 340A bit 2 | ... | 340P bit 6 | 340P bit 7 |

It is further noted that the above-described embodiments may comprise software. For example, the functionality of byte permute unit 300 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
    a decode unit; and
    a byte permute unit, wherein the byte permute unit comprises a bit shift unit configured to perform bit shift operations in only a first direction;
    wherein the byte permute unit is configured to:
        receive from the decode unit an instruction;
        in response to determining the instruction corresponds to a shuffle instruction, use a byte shuffler to perform a shuffle operation indicated by the instruction;
        in response to determining the instruction corresponds to a shift instruction, determine whether the instruction corresponds to a shift in a first direction or in a direction opposite to the first direction.

2. The processor of claim 1, wherein the shift instruction indicates a shift magnitude, and wherein the byte permute unit is further configured to:
    in response to determining the instruction corresponds to a shift instruction in the first direction:
        use the byte shuffler to byte-level shift a source operand corresponding to the instruction by an integer number of bytes in the first direction, wherein said integer number of bytes equals a quotient of the shift magnitude divided by eight; and
        use the bit-shift unit to bit-shift the byte-level shifted source operand by a number of bits in the first direction, wherein the number of bits equals the shift magnitude modulo eight;
    in response to determining the instruction corresponds to a shift instruction in a direction opposite to the first direction:
        use the byte shuffler to byte-level shift a source operand corresponding to the instruction by an integer number of bytes in the direction opposite to the first direction, wherein said integer number of bytes equals one plus a quotient of the shift magnitude divided by eight; and
        use the bit-shift unit to bit-shift the byte-level shifted source operand by a number of bits in the first direction, wherein the number of bits equals eight minus the shift magnitude modulo eight.

3. The processor of claim 2, wherein the source operand as byte-level shifted comprises one additional byte to accommodate temporary overshifting during shift operations in the direction opposite to the first direction.

4. The processor of claim 2, wherein the source operand comprises 128 bits, and wherein the byte permute unit is further configured to:
    force a value of a bit at an output bit position to zero in response to detecting either of:
        the arithmetic computation results in a negative value; or
        the arithmetic computation results in value greater than 127.

5. The processor of claim 2, wherein the source operand comprises 128 bits, and wherein the byte permute unit is further configured to force a value of a bit of a sequence of output bits to a value of a most significant bit of the byte-shifted source operand in response to detecting the shift operation is an arithmetic right shift operation and the arithmetic computation results in value greater than 127.

6. The processor of claim 1, wherein for each output byte in a sequence of output bytes, a byte index value corresponds to an output byte position in the sequence and performing a byte-level shift comprises:
    performing an arithmetic computation on the byte index and the integer number of bytes; and
    using a result of said arithmetic computation to select data in a byte position of the source operand for relocation to an output byte position.

7. The processor of claim 6, wherein the source operand comprises 16 bytes, and wherein for each output byte in the sequence the byte permute unit is further configured to:
    force a value of each bit to a value of a most significant bit of the source operand in response to detecting the shift operation is an arithmetic right shift operation and the arithmetic computation results in value greater than 15; and
    force a value of each bit to zero in response to detecting the shift operation is not an arithmetic right shift operation and either of:
        the arithmetic computation results in a negative value; or
        the arithmetic computation results in a value greater than 15.

8. A byte-permute unit comprising:
    an input configured to receive an instruction;
    an output configured to convey data bytes corresponding to a plurality of output byte positions; and
    control circuitry, wherein the control circuitry is configured to:
        perform bit shift operations in only a first direction;
        determine whether the instruction corresponds to a shuffle instruction or a shift instruction;
        in response to determining the instruction corresponds to a shuffle instruction: use a byte shuffler to perform a shuffle operation indicated by the instruction;
        in response to determining the instruction corresponds to a shift instruction, determine whether the instruction corresponds to a shift in a first direction or in a direction opposite to the first direction.

9. The byte-permute unit of claim 8, wherein the shift instruction indicates a shift magnitude, and wherein the control circuitry is further configured to:
    in response to determining the instruction corresponds to a shift instruction in the first direction:
        use the byte shuffler to byte-level shift a source operand corresponding to the instruction by an integer number of bytes in the first direction, wherein said integer number of bytes equals a quotient of the shift magnitude divided by eight; and
        bit-shift the byte-level shifted source operand by a number of bits in the first direction, wherein the number of bits equals the shift magnitude modulo eight;
    in response to determining the instruction corresponds to a shift instruction in a direction opposite to the first direction:
        use the byte shuffler to byte-level shift a source operand corresponding to the instruction by an integer number of bytes in the direction opposite to the first direction, wherein said integer number of bytes equals one plus a quotient of the shift magnitude divided by eight; and
        bit-shift the byte-level shifted source operand by a number of bits in the first direction, wherein the number of bits equals eight minus the shift magnitude modulo eight.

10. The byte-permute unit of claim 9, wherein source operand as byte-level shifted comprises one additional byte to accommodate temporary overshifting during shift operations in the direction opposite to the first direction.

11. The byte-permute unit of claim 9, wherein the source operand comprises 128 bits, and wherein the byte-permute unit is further configured to:
  force a value of a bit at an output bit position to zero in response to detecting either of:
    the arithmetic computation results in a negative value; or
    the arithmetic computation results in value greater than 127.

12. The byte-permute unit of claim 9, wherein the source operand comprises 128 bits, and wherein the byte-permute unit is further configured to force a value of a bit of a sequence of output bits to a value of a most significant bit of the byte-shifted source operand in response to detecting the shift operation is an arithmetic right shift operation and the arithmetic computation results in value greater than 127.

13. The byte-permute unit of claim 8, wherein for each output byte in a sequence of output bytes, a byte index value corresponds to an output byte position in the sequence and performing a byte-level shift comprises:
  performing an arithmetic computation on the byte index and the integer number of bytes; and
  using a result of said arithmetic computation to select data in a byte position of the source operand for relocation to an output byte position.

14. A method comprising:
  receiving an instruction;
  in response to determining the instruction corresponds to a shuffle instruction: using a byte shuffler to perform a shuffle operation indicated by the instruction;
  in response to determining the instruction corresponds to a shift instruction, determining whether the instruction corresponds to a shift in a first direction or in a direction opposite to the first direction; and
  in response to determining the shift instruction corresponds to a bit shift operation, performing the bit shift operation using a bit shift unit configured to perform bit shift operations in only a first direction.

15. The method of claim 14, wherein the shift instruction indicates a shift magnitude, the method further comprising:
  in response to determining the instruction corresponds to a shift instruction in the first direction:
    using the byte shuffler to byte-level shift a source operand corresponding to the instruction by an integer number of bytes in the first direction, wherein said integer number of bytes equals a quotient of the shift magnitude divided by eight; and
    bit-shifting the byte-level shifted source operand by a number of bits in the first direction, wherein the number of bits equals the shift magnitude modulo eight;
  in response to determining the instruction corresponds to a shift instruction in a direction opposite to the first direction:
    using the byte shuffler to byte-level shift a source operand corresponding to the instruction by an integer number of bytes in the direction opposite to the first direction, wherein said integer number of bytes equals one plus a quotient of the shift magnitude divided by eight; and
    bit-shifting the byte-level shifted source operand by a number of bits in the first direction, wherein the number of bits equals eight minus the shift magnitude modulo eight.

16. The method of claim 15, wherein the source operand as byte-level shifted comprises one additional byte to accommodate temporary overshifting during shift operations in the direction opposite to the first direction.

17. The method of claim 15, wherein the source operand comprises 128 bits, and wherein the method further comprises forcing a value of a bit at an output bit position to zero in response to detecting either of:
  the arithmetic computation results in a negative value; or
  the arithmetic computation results in value greater than 127.

18. The method of claim 15, wherein the source operand comprises 128 bits, and wherein the method further comprises forcing a value of a bit of a sequence of output bits to a value of a most significant bit of the byte-shifted source operand in response to detecting the shift operation is an arithmetic right shift operation and the arithmetic computation results in value greater than 127.

19. The method of claim 14, wherein for each output byte in a sequence of output bytes, a byte index value corresponds to an output byte position in the sequence and performing a byte-level shift comprises:
  performing an arithmetic computation on the byte index and the integer number of bytes; and
  using a result of said arithmetic computation to select data in a byte position of the source operand for relocation to an output byte position.

20. The method of claim 19, wherein the source operand comprises 16 bytes, and wherein for each output byte in the sequence the method further comprises:
  forcing a value of each bit to a value of a most significant bit of the source operand in response to detecting the shift operation is an arithmetic right shift operation and the arithmetic computation results in value greater than 15; and
  forcing a value of each bit to zero in response to detecting the shift operation is not an arithmetic right shift operation and either of:
  the arithmetic computation results in a negative value; or
  the arithmetic computation results in a value greater than 15.

* * * * *